Aug. 21, 1945.    H. O. CODDINGTON    2,382,975
BALL BEARING
Filed Oct. 26, 1943
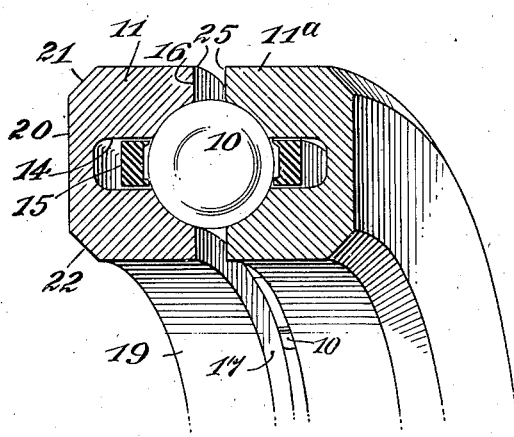
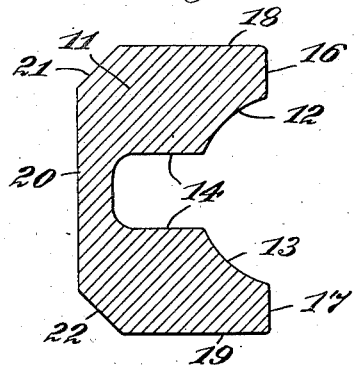
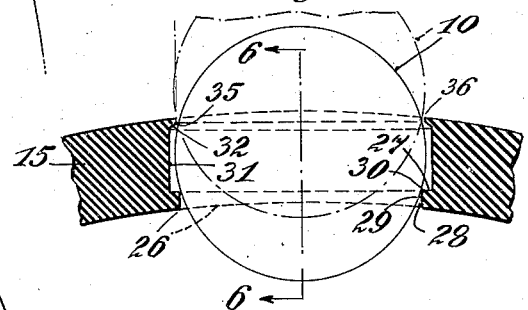
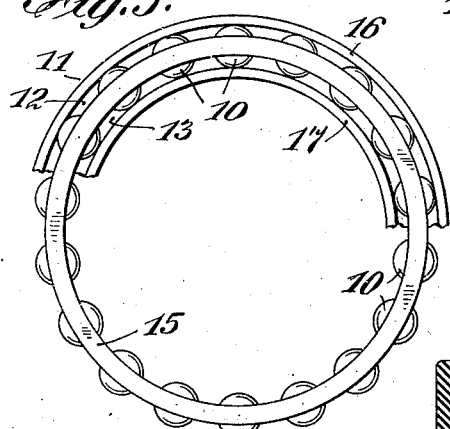
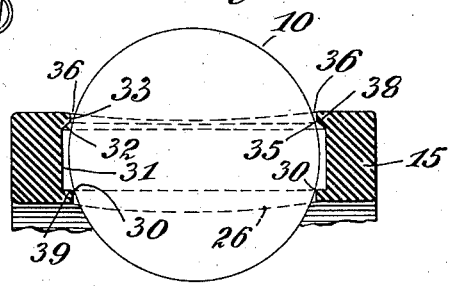
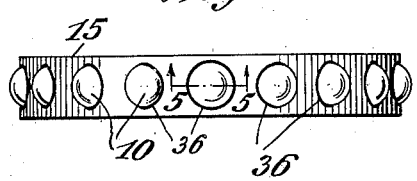
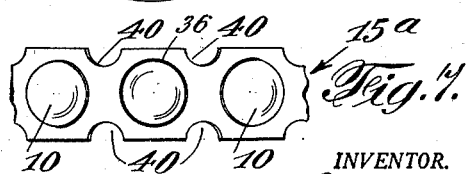
INVENTOR.
Howard O. Coddington
BY
C. P. Goepel
his ATTORNEY Patented Aug. 21, 1945

2,382,975

UNITED STATES PATENT OFFICE 2,382,975

BALL BEARING

Howard O. Coddington, Spartanburg, S. C., assignor to Andrews Company, Spartanburg, S. C., a copartnership composed of Isaac Andrews, Howard O. Coddington, Mary E. Andrews, Sarah Andrews, Martha W. Andrews, and A. J. R. Helmus Application October 26, 1943, Serial No. 507,679

2 Claims. (Cl. 308—235)

This invention relates to ball bearings and more particularly has for its object to provide a ball bearing in which the races are readily separable to enable the balls to be assembled therebetween, and on the other hand to enclose the cage holding the assembled balls.

A further object is to provide a bearing in which the races are so disposed in respect to the balls that the bearing acts both as a radial and as a thrust bearing as the bearing is subjected to various forces during the contemplated use of such a bearing.

The invention consists of vertical laterally disposed identical minor reverse race members having curved surfaces cooperating with the balls held therein to act either as a radial or a thrust bearing depending upon the resultant of the forces set into action, and the invention consists further in providing between the curved surfaces of each member, a cutout in the member for enclosing therein the walls of the cage for the balls.

And the invention further consists in the combination of such race members with a cage ring having circumferentially disposed openings provided with spaced corners in the direction of the internal side of the cage ring to the external side thereof, said corners being formed on lips with the lip at the external side having a diameter smaller than the diameter of the balls to permit the balls to be pressed therethrough and held in position between the two lip portions and the corners thereof, in order to give a freedom of movement for the balls between said corners, while the balls adjust themselves to the race members.

The invention will be further described hereinafter, embodiments thereof shown in the drawing, and finally pointed out in the claims.

In the accompanying drawing—

Fig. 1 is a central section of the improved race members and the improved cage showing the balls held therein;

Fig. 2 is a longitudinal section of one of the race members as to which the other race member is in mirror-reverse;

Fig. 3 is a side view of a ball bearing showing the balls held by the cage and a fragmentary view of one of the race members looking at the same from its central portion;

Fig. 4 is a plan view of the improved cage holding the balls therein;

Fig. 5 is a longitudinal section of part of the cage taken on line 5—5 of Fig. 4;

Fig. 6 is a vertical section taken on line 6—6 of Fig. 5; and

Fig. 7 is a fragmentary plan view of the cage having a modification thereof in the form of circumferentially spaced cutouts so that the walls thereof act as baffles for the actuating of the oil or lubricant within the race members.

Similar characters of reference indicate corresponding parts throughout the various views.

Referring to the drawing, and more particularly to Figs. 1 and 2:

In Fig. 1 the usual balls 10 are circumferentially spaced in the manner well known in ball bearings. At each side of said balls 10 a race member is provided and these two race members are identical but in mirror-reverse to each other. One of these race members is indicated by 11 and the other by 11a. Taking race member 11 into consideration and referring to Fig. 2, the race member 11 has a race 12 at its upper part or its radial outer part, and another race 13 at its lower part or at its radial inner part. The curvature of these races 12 and 13 correspond substantially with the curvature of the balls at their meridian. Disposed between the races 12 and 13 there is a circumferentially extending cutout 14 which is large enough to enclose the cage wall 15. The cage wall 15 has no part contacting with the walls of this cutout 14, and is freely movable, that is, rotatable within the cutout 14. Sufficient space is provided in the cutout 14 beyond that necessary to be occupied by the cage to provide for a reservoir for the lubricant. The remaining contour of the race member 11 is defined by vertical or radial walls 16 and 17 by a circumferentially circular wall forming the outer portion indicated by 18 and by a concentric circumferentially circular inner wall 19, which walls merge at the lateral portion of the race members indicated by 20, bevelled portions 21 and 22 being provided.

One of these race members is secured to the shaft or rotor and the other race member to the housing or stator in a manner well known in ball bearings, and because well known not shown in the drawing. By having the two race members 11 and 11a cooperating with the balls 10 through their races 12 and 11a with the space between the race members 11 and 11a as generally indicated by 25 which may be more or less than as shown, the races when acted upon by the balls act either as a radial bearing or as a thrust bearing dependent upon the resultant of forces set into action during the operation of the bearing.

Referring now to the improved cage, which is shown more particularly in Figs. 2, 3, 5 and 6, this consists of a unitary piece which is provided with spaced openings 26 circumferentially disposed. The walls which form these openings 26 are of a peculiar construction. The inner side of the cage ring 15 is provided with a shoulder 27 which terminates in an angular corner 30 and which is intended to act as a contact point to the ball when the ball is seated thereon. The remaining wall 29 which forms this shoulder with the wall 27 is spaced from the ball so as to form a space 28. The shoulder 27 merges into a wall 31 and from this an angular wall 32 extends away from the wall 31 and also forms with a wall 33 an angular corner 35 which contacts with the ball. The wall 33 which with the wall 32 forms the corner 35 forms a space 36 with the ball. The material formed by the walls 32 and 33 is in the shape of a lip and has an inherent resiliency so as to yield upon pressure being exerted circumferentially of the lip. The diameter of the circle formed by the corner 35 or lip is slightly smaller than the diameter of the ball so that when the ball is pressed from the outside of the cage sufficient pressure must be exerted upon the ball to enable the lip to give inwardly, that is from the outside to the inside of the cage, so as to permit the passage of the ball through the lip space after which the ball seats itself upon the corner 30 and the disposition of this corner 30 is such that the lip thereof, indicated by 39, does not give and acts as an abutment against any further inward movement of the ball. The lip 38 having the corner 35 and the lip 39 having the corner 30 are so disposed in respect to the ball that the ball permits a generally radial movement from its contact with one lip or the other and this freedom of movement of the ball within the cage in a generally radial direction enables the ball to cooperate with the races 12 and 13 to act as a radial bearing or a thrust bearing dependent upon the resultant of the forces set into action.

The balls may be readily assembled into the cage by pressing them from the outside into the cage and after the balls have all been so assembled the unitary cage which may be preferably made of plastic material holds all the balls with the freedom of movement described and the cage so filled is then ready to be applied within the race members 11 and 11a with the body of the cage extending laterally in each direction from the balls into the cutout 14 of the race members.

A modified form of cage ring is shown in Fig. 7, generally indicated by 15a and is provided at its marginal portions with cutouts 40 which are shown circular in shape, but which shape may be modified, the feature here being that the walls of the cutouts will act as plates or baffles in order to agitate the lubricant held within the cutouts 14 of the race members 11 and 11a. From the foregoing it appears that the invention embodies the use of a pair of identical race members but in mirror reverse, one on each side of a plurality of spaced balls and each having a pair of circumferential races separated by a cutout for the cage for the balls, the races having a curvature substantially that of the curvature of the balls. By providing a cage in which the balls have a freedom of movement, an efficient bearing is provided.

I have described various embodiments of my invention, but obviously changes may be made in the details disclosed without departing from the spirit of the invention as set out in the following claims.

What I claim is:

1. In a ball bearing, a pair of identical mirror reverse race members, and antifriction balls therebetween, each member being disposed laterally of the plane of rotation of the balls, and each having a pair of races, the curvature of the races and the extent of curvature being the same, and the curvature of the races being substantially that of the balls, the members being spaced from each other when the balls contact with the races, said members each having a circumferential cutout between the races forming each pair, for the passage of the cage for the balls.

2. The combination of a plurality of spaced balls circumferentially arranged in a plane, and a pair of identical race members in mirror reverse each disposed laterally of said plane, and each having a pair of races with a cutout therebetween, the curvature of the races and the extent of the curvature being substantially the same, and substantially that of the balls held thereby, said members being spaced from each other while the races contact with the balls, with a cage having lateral portions extending into the cutouts, and having ball openings with pairs of lips, one of the lips of said pair having a yieldable portion for the passage of the balls, and the balls having a freedom of movement between the lips.

HOWARD O. CODDINGTON.